United States Patent
Guillard et al.

[11] Patent Number: 5,850,420
[45] Date of Patent: Dec. 15, 1998

[54] WIDEBAND RECEIVER FOR THE MEASUREMENT OF DISTANCE BY PSEUDO-RANDOM CODE SIGNALS

[75] Inventors: Patrice Guillard, Valence; Alain Renard, Chabreuil, both of France

[73] Assignee: Sextant Avionique, Velizy Villacoublay, France

[21] Appl. No.: 722,312

[22] Filed: Sep. 27, 1996

[30] Foreign Application Priority Data

Oct. 6, 1995 [FR] France .................................. 95 11795

[51] Int. Cl.$^6$ ................................................ H03K 9/00
[52] U.S. Cl. ........................................... 375/316; 375/208
[58] Field of Search ................................... 342/355–357; 370/468, 479, 503, 517; 375/200, 206–208, 210

[56] References Cited

U.S. PATENT DOCUMENTS

| | | | |
|---|---|---|---|
| 4,550,414 | 10/1985 | Guinon et al. | 375/200 |
| 5,101,416 | 3/1992 | Fenton et al. | 375/200 |
| 5,253,268 | 10/1993 | Omura et al. | 375/200 |
| 5,414,729 | 5/1995 | Fenton | 375/209 |
| 5,495,499 | 2/1996 | Fenton et al. | 375/205 |
| 5,600,670 | 2/1997 | Turney | 375/208 |

FOREIGN PATENT DOCUMENTS

| | | |
|---|---|---|
| 0 522 975 A2 | 7/1993 | European Pat. Off. . |
| 2 189 969 | 11/1987 | United Kingdom . |

*Primary Examiner*—Stephen Chin
*Assistant Examiner*—Joseph Roundtree
*Attorney, Agent, or Firm*—Oblon, Spivak, McClelland, Maier & Neustadt, P.C.

[57] ABSTRACT

This receiver comprises a signal processor using the correlation of the received composite signal with early/late, locally generated pseudo-random codes. The code generator sends its signals to a delay line whose evenly spaced out outputs (E2, E1, P, L1, L2) are combined according to the relationship:

$$c = E2 - 2E1 + 2L1 - L2$$

before being sent to one of the correlators (C2) while the other (C1) receives the punctual signal (P). This especially reduces the positional error due to the multiple-path delays.

8 Claims, 5 Drawing Sheets

WIDEBAND RECEIVER FOR THE MEASUREMENT OF DISTANCE BY PSEUDO-RANDOM CODE SIGNALS

BACKGROUND OF THE INVENTION

The present invention pertains to a radio-localization receiver for the measurement of distance by pseudo-random codes.

Passive systems of positioning and navigation such as the "global positioning system" (GPS) or its Russian equivalent, the "global navigation system" (GLONASS), enable a user to achieve a precise determination of his latitude, longitude and altitude as well as the time from signals transmitted by a constellation of satellites. These systems are well known and are based on the transmission, by the satellites, of pseudo-random codes. A user's receiver has to process a composite HF signal coming from those of these satellites that are in direct line of sight.

Each satellite transmits information at a low bit rate. This information comprises navigation data elements such as the ephemerides of the satellite, the current time and information on status. The satellite transmits this information by means of a system of two-phase encoding. The GPS system uses code division multiple access and the GLONASS system uses frequency division multiple access.

In both cases, a receiver processes the signal of a satellite by correlating the received composite signal with the locally generated pseudo-random code. The position in time of this code gives a means of measuring the time taken to transmit the signal from the satellite and consequently determining the position and speed in three dimensions and the exact time from at least four satellites.

The temporal position of the pseudo-random code is usually measured by means of a delay lock loop that achieves the early, punctual and late local code correlation with the composite signal. The correlation signals, after filtering and processing, are used to control the synchronization of the local pseudo-random code generator. By preserving the locking of the loop, it is possible to track the satellite and demodulate the navigation data elements superimposed on the pseudo-random code.

However, such systems must measure the time of propagation in direct line of sight and, in this case, they are subjected to distortions of ionospherical origin (delays) or distortions due to multiple paths for example.

A known approach consists in the use of early-late correlators, for which the conventional spacing of one code bit time (chip) is reduced, after acquisition, to a fraction of one chip, thus substantially reducing the tracking error due to the multiple paths.

However, this approach is not wholly satisfactory for there remain substantial residual errors that are inconvenient, in particular for applications that need precision (such as approach, landing, etc.).

SUMMARY OF THE INVENTION

An object of the invention therefore is an improved receiver that can be used, with clear Acquisition codes (C/A codes), to achieve performance characteristics equivalent to that of a conventional receiver using a precision code P (P code), through the use of a new type of quadruple correlation.

According to the invention, there is therefore provided a wideband receiver for the measurement of distance by signals modulated by pseudo-random codes, said receiver demodulating and decoding a composite HF signal including several transmitted signals modulated by pseudo-random codes, said receiver comprising frequency-changing, filtering and sampling-encoding means and a plurality of channels, each designed to demodulate and decode one of the signals modulated by pseudo-random codes on the basis of the samples given by the sampling-encoding means, each channel comprising a pseudo-random code generator synchronized by a control signal and correlation means receiving said samples of the composite signal and the code given by the pseudo-random code generator with adjustable delays and giving correlation signals so as to make it possible to determine said control signal, wherein said correlation means comprise at least two correlators, means for the combination of early and late pseudo-random codes to give a quadruple correlation signal and switch-over means to configure said correlators in a first mode of acquisition as early and late correlators and in a second mode as punctual and combined quadruple correlators.

BRIEF DESCRIPTION OF THE DRAWINGS

The invention will be understood more clearly and other features and advantages shall appear from the following description and from the appended drawings, of which.

DESCRIPTION OF THE PREFERRED EMBODIMENTS

Figure 1:
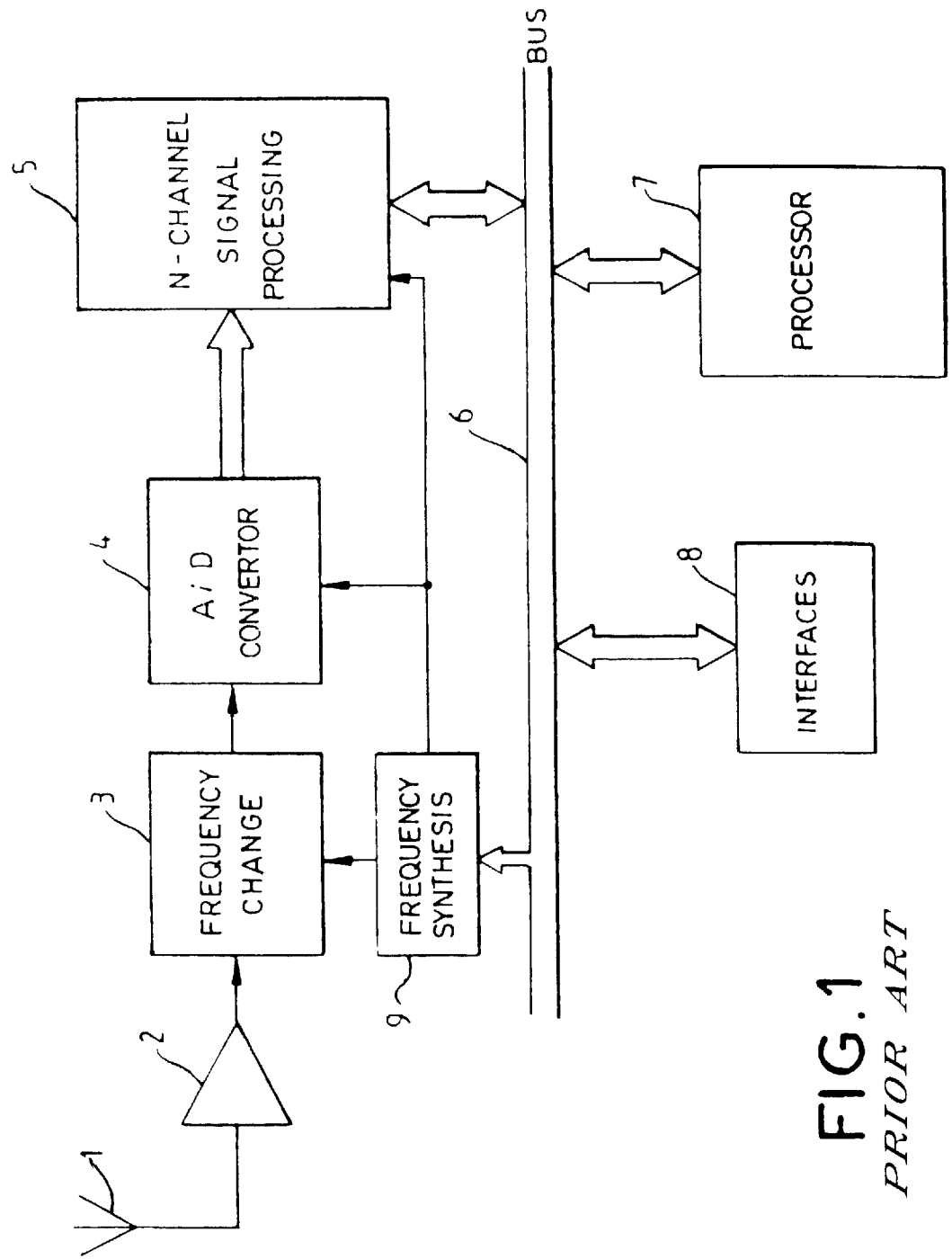
FIG. 1 is a general block diagram of the pseudo-random code receiver.

FIG. 1 shows the general block diagram of a pseudo-random code receiver. This receiver has an antenna 1, a low-noise amplifier filtering set 2, a frequency-changing set 3 receiving one (or more) local oscillator signals OL, an analog-digital sampler/converter 4, an n-channel signal processor 5, a bus 6, a processor 7, interfaces 8 and a frequency synthesizer unit 9.

The antenna 1 receives a composite HF signal comprising the signals transmitted by all the satellites in direct line of sight. The composite signal is sent to a frequency-changing set 3 that gives an intermediate frequency signal to the analog-digital sampler/converter 4 as well as a sampling clock signal used to determine the points in time at which the a samples have to be taken. These samples are sent on a signal bus to the signal processor 5. This device associated with the processor 7 has n channels, each of which is designed to process the signals of one particular satellite that is visible to the receiver. Each channel may therefore process the signals in phase and in quadrature of a satellite and enables the tracking of the carrier and of the code assigned to this satellite. As shall be seen here below, each channel uses a carrier and code synchronization circuit to get locked in phase and in frequency with the carrier signal modulated by the pseudo-random code in maintaining a Doppler shift specific to the satellite considered. Each channel therefore maintains a lock with a locally generated pseudo-random code in making use of two correlators in a delay lock loop. The device 5 with the processor 7 thus carries out the demodulation of data elements.

This description of FIG. 1 corresponds to a conventional GPS receiver architecture.

Figure 2:
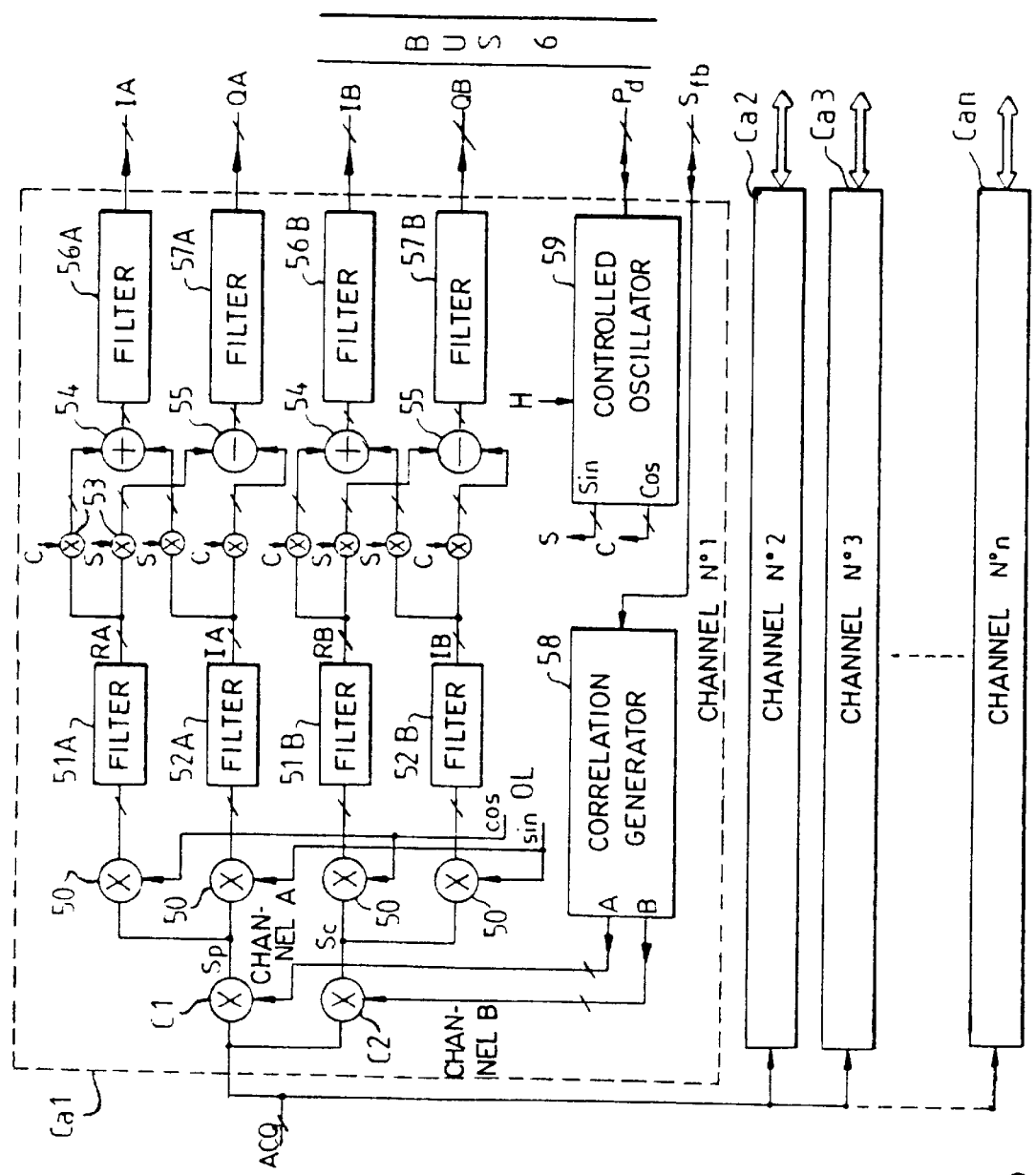
FIG. 2 is a diagram of the n-channel signal processing part.

FIG. 2 is a more detailed diagram of the signal processing device 5. The device receives the samples ACQ of the composite signal. It has n identical channels Ca1 to Can each assigned to a particular satellite that is visible at the time. Only the channel Ca1 is shown in greater detail.

It has two correlators C1 and C2 and a correlation generator device 58 controlled by a signal $S_{fb}$. The correlation signals obtained Sp and Sc are transposed into baseband on the basis of a local oscillator signal OL and multipliers 50 for each of the components in phase and in quadrature. These baseband signals are filtered by the filters 51A, 52A, 51B, 52B respectively of the channels A and B. After the elimination of the Doppler component by means of a numerical control oscillator 59, controlled by the Doppler phase signal $P_d$ coming from the processor 7 through the bus 6, and of multipliers 53 receiving the sine S and cosine C outputs of the oscillator 59, a narrow-band (for example 1 kHz) filtering is carried out by means of the filters 56A, 57A, 56B, 57B which respectively deliver the components in phase I and quadrature Q of the channels A and B (IA, QA, IB, QB). These components are processed by the processor to give a control signal for the carrier and code numerical control oscillators (NCO)

As explained further above, in the known systems, the correlation generator, during the acquisition phase, provides early-late codes to the two correlators, typically spaced out by one code chip. After acquisition, the correlation generator provides punctual/early-minus-late codes to the two correlators with a spacing reduced to a fraction of a chip.

According to the invention, a modified correlation generator 58 is used. This generator is shown schematically in FIG. 3. This generator has first of all a numerical control oscillator 581 that is controlled by the reaction signal $S_{fb}$ and drives a pseudo-random code generator 580. The codes produced by this generator are sent to a digital delay line with five ports that are evenly spaced out. This digital delay line comprises identical adjustable delay elements 582. The outputs of the delay line respectively give the early signals E2, E1, the punctual signal P and the late signals L1, L2. These signals, after being weighted by the circuits 583, are combined by an adder 584 to form an arithmetic combination C according to the relationship:

$$C = E2 - 2E1 + 2L1 - L2 \tag{1}$$

This combination can be sent to the correlator C2 by means of a change-over switch 585 also receiving the early code E1. Similarly, the correlator C1 can receive either the punctual signal P or the late signal L through a change-over switch 586.

The following is the operation:

In the acquisition phase, the two correlators C1 and C2 work in a conventional late/early way, receiving the codes L1 and E1 by means of the switches 586 and 585. Furthermore, the delays introduced by the elements 582 are adjusted to a value such that the spacing between E1 and L1 is equal to approximately one code chip.

Figure 3:
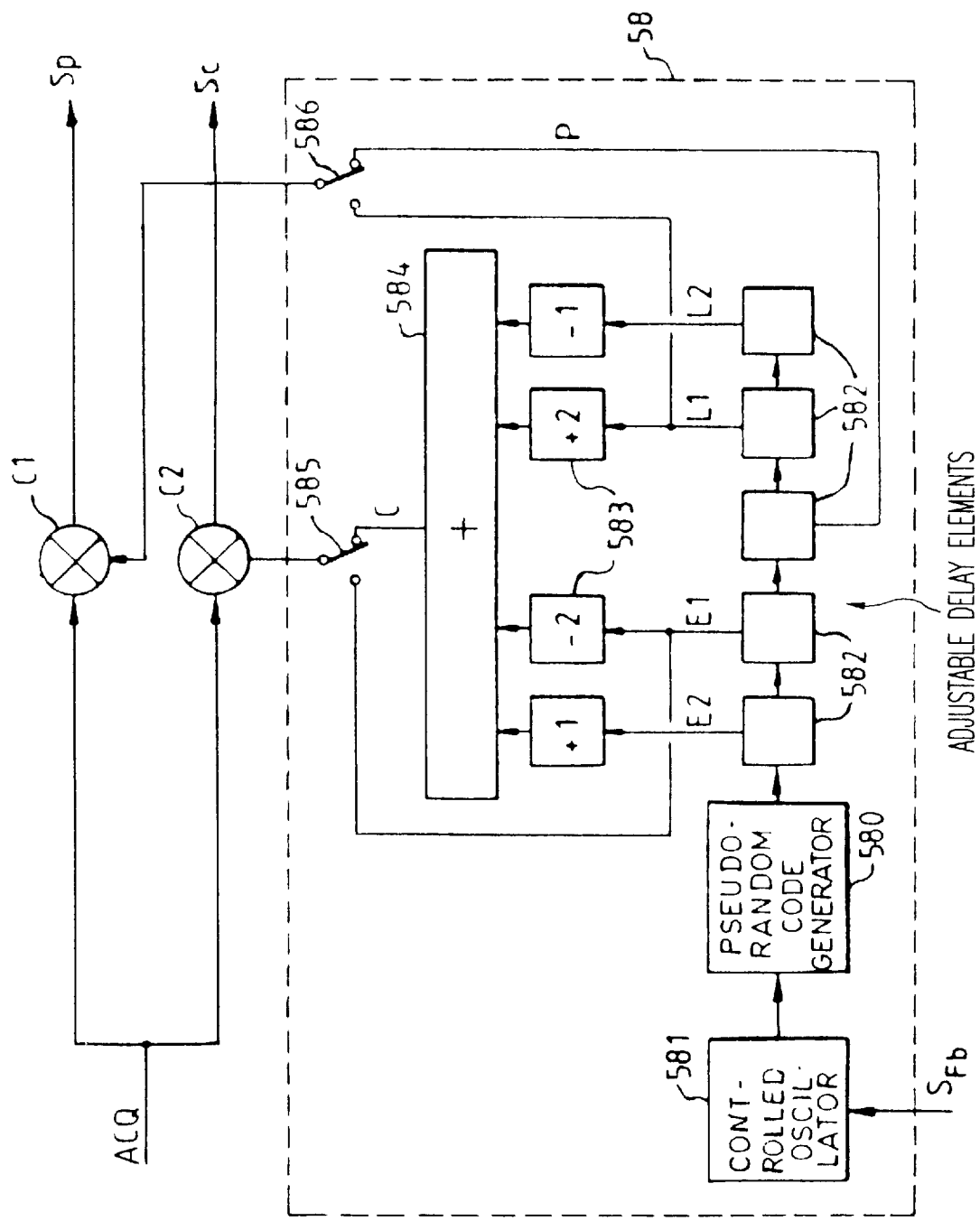
FIG. 3 is a diagram of the correlation means of the receiver according to the invention.

When the delay lock loop (DLL) is locked, the switches 585, 586 are switched over to the position shown in FIG. 3 and the spacing [the delay increment of the line] is programmed to a fraction of one chip (approximately 0.2 code chips for the GPS).

Figure 4:
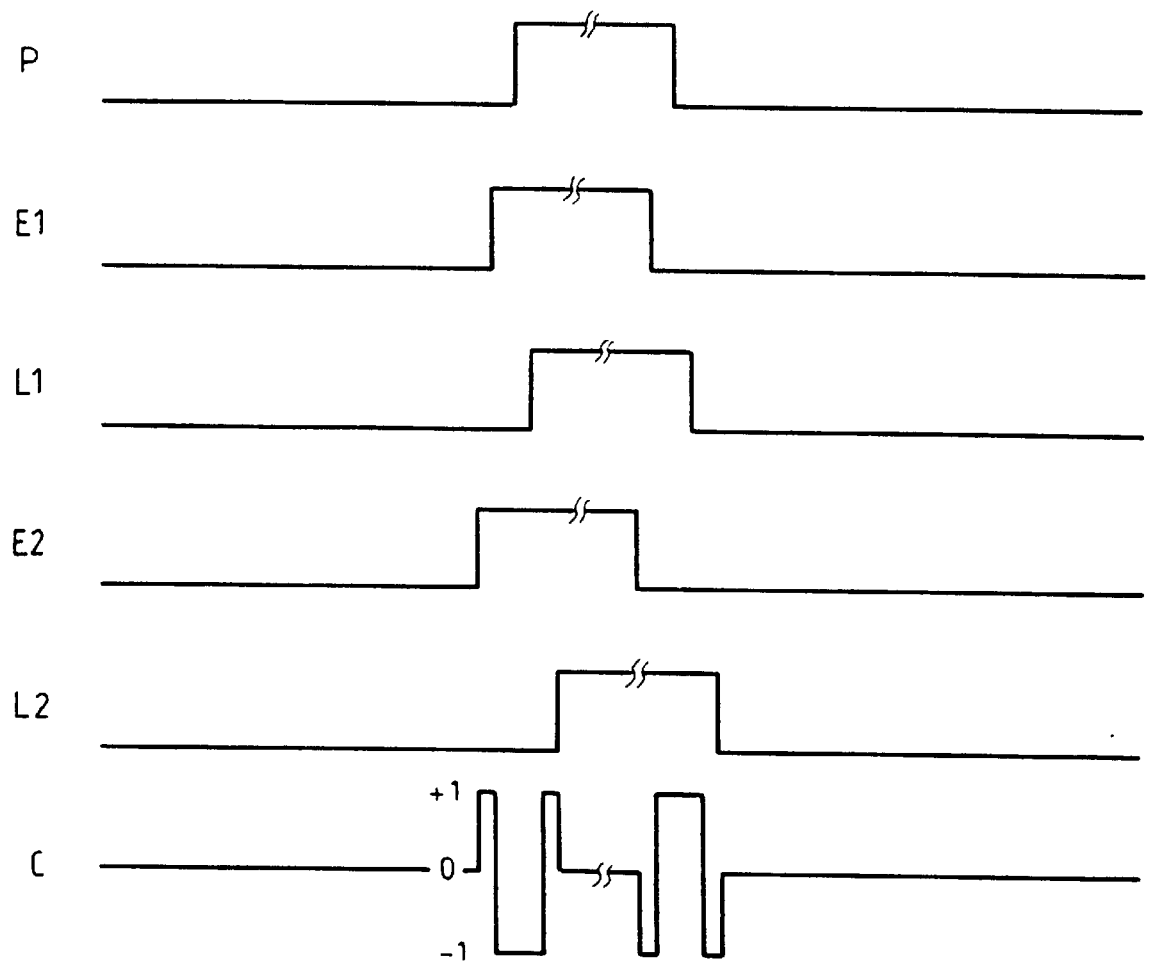
FIG. 4 is a timing diagram of the signals of the correlation means.

This enables a considerable reduction of the positional error as a function of the delay of the multiple path. Furthermore, another advantage of the quadruple correlation according to the relationship (1) results from the fact that the standardized output of the combination C has only three states −1, 0 and +1 as can be seen from the graphs of FIG. 4. This is of definite value for the correlation with the composite signal received ACQ is done very easily by means of simple circuits based on inverters and multiplexers without there being any need for multipliers.

Figure 5:
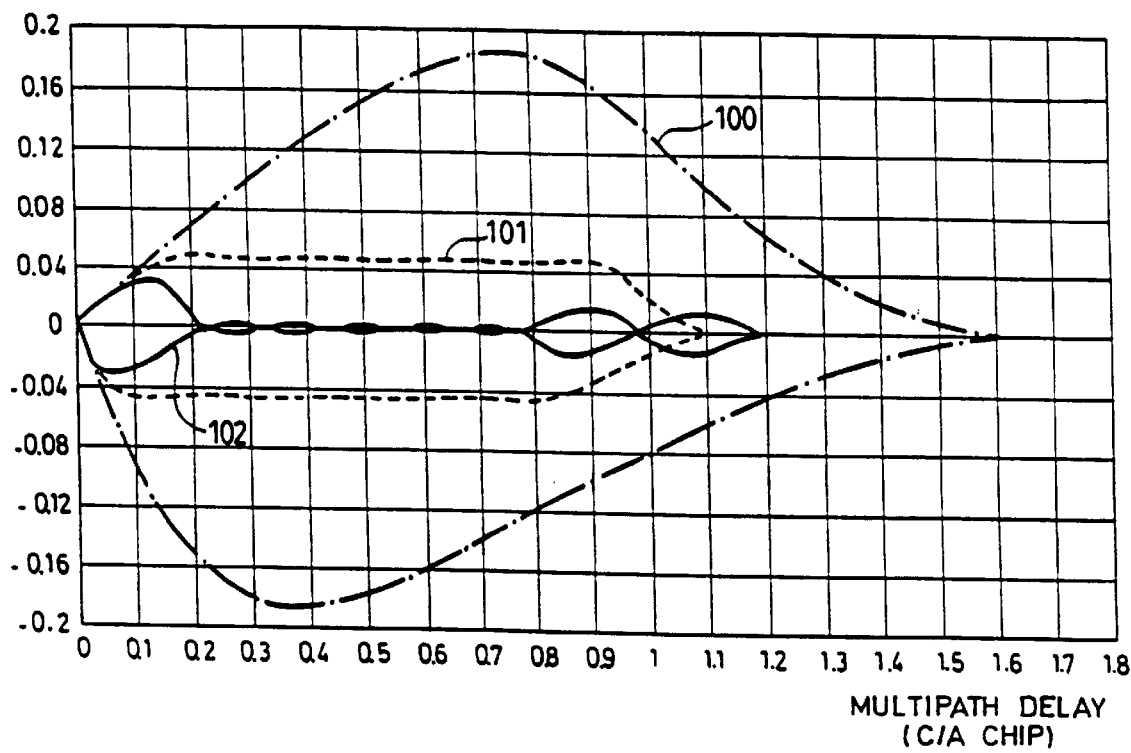
FIG. 5 shows the envelope curves pertaining to positional error as a function of the multiple-path delay for various spacings of known correlators and for the correlator according to the invention.

The performance characteristics of the correlation system according to the invention can be appreciated from the curves of FIG. 5.

The curve 100 represents the envelope of the positional error for a spacing of one C/A code chip; the curve 101 represents the envelope of the positional error for correlators with a spacing reduced to 0.2 C/A code chips, as a function of the delay of the multiple path expressed in C/A code chips.

Finally, the curve 102 pertains to the correlation system according to the invention with a spacing of 0.2 C/A code chips. It can be seen that, for the system according to the invention, the positional error is practically zero for a multiple path delay ranging from 0.2 to 0.8 C/A code chips. It is clear that the performance characteristics of the system according to the invention (curve 102) are better than those of a known improved correlator with reduced spacing (curve 101).

The receiver described here above may be set up for example with an ASIC type circuit for all the circuits up to the output of the channels (1 kHz output). Beyond, the tasks will be performed at a low rate enabling the use of a universal microprocessor or a DSP.

Naturally, the example described in no way restricts the scope of the invention.

What is claimed is:

1. A wideband receiver for the measurement of distance by signals modulated by pseudo-random codes, said receiver demodulating and decoding a composite HF signal including several transmitted signals modulated by pseudo-random codes, said receiver comprising frequency-changing, filtering and sampling-encoding means and a plurality of channels, each designed to demodulate and decode one of the signals modulated by pseudo-random codes on the basis of the samples given by the sampling-encoding means, each channel comprising a pseudo-random code generator synchronized by a control signal and correlation means receiving said samples of the composite signal and the code given by the pseudo-random code generator with adjustable delays and giving correlation signals so as to make it possible to determine said control signal, wherein said correlation means comprise at least two correlators, means for the combination of early and late pseudo-random codes to give a quadruple correlation signal and switch-over means to configure said correlators in a first mode of acquisition as early and late correlators and in a second mode as punctual and combined quadruple correlators.

2. A receiver according to claim 1, wherein said combination means comprise:

a delay line with five evenly spaced out adjustable-delay ports receiving said pseudo-random code given by the pseudo-random code generator and giving signals with successive delays differing by a given delay increment; and circuits for the computation of an arithmetic combination C such that:

$$C = E2 - 2E1 + 2L1 - L2$$

where E1 and E2 are the signals given by the delay line with respective advances of one and two increments with respect to the punctual signal P given on the central output of the delay line and L1 and L2 are the signals given by the delay line with respective delays of one and two increments with respect to the punctual signal P.

3. A receiver according to claim 2, wherein said delay increment is chosen so as to be substantially equal to one pseudo-random code chip in the first mode of acquisition and to a fraction of one pseudo-random code chip in the second mode.

4. A receiver according to claim 2, wherein the quadruple correlation signal of said combination means is generated by said circuits for the computation of an arithmetic combination such that C=E2−2E1+2L1−L2 during said second mode.

5. A receiver according to claim 1, wherein said correlation means comprises a first correlator and a second correlator such that said first correlator is configured by said switch-over means to receive early pseudo-random codes in said first mode and the punctual code in said second mode and said second correlator is configured by said switch-over means to receive late pseudo-random codes in said first mode and the quadruple correlation signal in said second mode.

6. A receiver according to claim 4, wherein said correlation means comprises a first correlator and a second correlator such that said first correlator is configured by said switch-over means to receive early pseudo-random codes in said first mode and the punctual code in said second mode and said second correlator is configured by said switch-over means to receive late pseudo-random codes in said first mode and the quadruple correlation signal in said second mode.

7. A wideband receiver for the measurement of distance by signals modulated by pseudo-random codes, said receiver demodulating and decoding a composite HF signal including several transmitted signals modulated by pseudo-random codes, said receiver comprising:

sampling-encoding means;

a plurality of channels, each channel designed to demodulate and decode one signal modulated by pseudo-random codes on the basis of samples given by said sampling-encoding means, each channel comprising:

a pseudo-random code generator;

a control signal synchronizing said pseudo-random code generator;

correlation means receiving samples of the composite signal and pseudo-random codes supplied by said pseudo-random code generator, said correlation means giving correlation signals for determining the control signal, said correlation means comprising:

at least first and second correlators;

combination means for the combination of early and late pseudo-random codes into a quadruple correlation signal; and switch-over means for configuring said correlators in one of a first mode of acquisition and a second mode of tracking;

wherein, during said second mode, said first correlator is configured to receive a punctual signal and said second correlator is configured to receive said quadruple correlation signal.

8. A receiver according to claim 7, wherein said combination means for combination of early and late pseudo-random codes into a quadruple correlation signal further comprises:

a delay line with five evenly spaced out adjustable-delay ports receiving said pseudo-random code given by the pseudo-random code generator and giving signals with successive delays differing by a given delay increment; and circuits for the computation of an arithmetic computation C wherein $$C=E2-2E1+2L1-L2$$

where E1 and E2 are signals given by the delay line with respective advances of one and two increments with respect to the punctual signal given on a central output of the delay line and L1 and L2 are the signals given by the delay line with respective delays of one and two increments with respect to the punctual signal.

* * * * *